US012746938B2

(12) United States Patent
Rosman et al.

(10) Patent No.: US 12,746,938 B2
(45) Date of Patent: Sep. 29, 2026

(54) BEHAVIOR-CONDITIONED MESSAGE STYLIZATION

(71) Applicant: Toyota Research Institute, Inc., Los Altos, CA (US)

(72) Inventors: Guy Rosman, Cambridge, MA (US); Jean Marcel dos Reis Costa, San Jose, CA (US); Hiroshi Yasuda, San Carlos, CA (US); Deepak Edakkattil Gopinath, Washington, DC (US); Jonathan DeCastro, Arlington, MA (US); Tiffany L Chen, San Jose, CA (US); Avinash Balachandran, Sunnyvale, CA (US)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 82 days.

(21) Appl. No.: 18/613,419

(22) Filed: Mar. 22, 2024

(65) Prior Publication Data

US 2025/0121845 A1 Apr. 17, 2025

Related U.S. Application Data

(60) Provisional application No. 63/589,510, filed on Oct. 11, 2023.

(51) Int. Cl.
*B60W 50/14* (2020.01)
*B60K 35/28* (2024.01)

(52) U.S. Cl.
CPC ....... *B60W 50/14* (2013.01); *B60W 2050/146* (2013.01)

(58) Field of Classification Search
CPC .......... B60W 30/18163; B60W 50/14; B60W 2540/215; B60W 2554/406; B60W 2720/10; B60W 2540/30; B60W 30/10; B60W 30/143; B60W 2050/146; G08G 1/167; H04W 4/46; B60K 35/28
USPC .......................................................... 701/36
See application file for complete search history.

(56) References Cited

U.S. PATENT DOCUMENTS

| | | | | |
|---|---|---|---|---|
| 9,354,958 | B2 | 5/2016 | Amendjian et al. | |
| 10,205,428 | B1 | 2/2019 | Paepcke et al. | |
| 10,929,596 | B2 | 2/2021 | Dhillon et al. | |
| 11,501,088 | B1 * | 11/2022 | Mariko | G06F 40/56 |

(Continued)

OTHER PUBLICATIONS

Duan, et al., "Pre-train and Plug-in Flexible Conditional Text Generation with VAEs", arXiv:1911.03882, 2019, 10 pages.

(Continued)

*Primary Examiner* — Hossam M Abd el Latif
(74) *Attorney, Agent, or Firm* — Christopher G. Darrow; Darrow Mustafa PC

(57) ABSTRACT

Systems, methods, and other embodiments described herein relate to stylizing messages within a vehicle according to an occupant and a current context. In one embodiment, a method includes determining a style for presenting messages associated with an occupant of a vehicle according to a context defined in relation to an occupant and an environment of the vehicle. The method includes generating a message according to the style for the occupant. The method includes providing the message to the occupant.

20 Claims, 5 Drawing Sheets

(56) References Cited

U.S. PATENT DOCUMENTS

| | | | | |
|---|---|---|---|---|
| 2019/0147736 | A1* | 5/2019 | Camp | G08G 1/0133 340/905 |
| 2019/0176845 | A1* | 6/2019 | Yoon | G06V 20/59 |
| 2020/0200558 | A1* | 6/2020 | Xu | G08G 1/096822 |
| 2020/0257859 | A1 | 8/2020 | Hewitt et al. | |
| 2021/0291841 | A1* | 9/2021 | Yamane | B60K 35/80 |
| 2021/0312122 | A1 | 10/2021 | O'Donncha et al. | |
| 2022/0245322 | A1* | 8/2022 | Lundin | G06T 11/60 |
| 2022/0258704 | A1* | 8/2022 | Byeon | B60T 7/122 |
| 2023/0242141 | A1* | 8/2023 | Yasui | B60W 50/14 340/438 |

OTHER PUBLICATIONS

Moorjani, et al., "Audience-Centric Natural Language Generation via Style Infusion", arXiv preprint arXiv:2301.10283, 2023, 14 pages.

Saakyan, et al., "ICLEF In-Context Learning with Expert Feedback for Explainable Style Transfer", arXiv preprint arXiv:2309.08583, 2023, 18 pages.

Korbak, et al., "Pretraining Language Models with Human Preferences", International Conference on Machine Learning, 2023, 28 pages.

* cited by examiner

BEHAVIOR-CONDITIONED MESSAGE STYLIZATION

CROSS-REFERENCE TO RELATED APPLICATIONS

This application claims benefit of U.S. Provisional Application No. 63/589,510, filed on, Oct. 11, 2023, which is herein incorporated by reference in its entirety.

TECHNICAL FIELD

The subject matter described herein relates, in general, to systems and methods for stylizing messages within a vehicle and, more particularly, to using a model-based approach to condition the stylization of messages according to contextual aspects relating to an occupant.

BACKGROUND

Vehicles often provide messages to occupants in order to convey alerts, current conditions, and other useful information. In some cases, the vehicle may provide the information in a textual form that is either displayed or provided as audible speech derived from the text. The text may take different forms but is generally predefined in a particular speaking pattern or with explicit content that is not adaptable. However, different people perceive information differently. Therefore, the predefined form of the text, whether visual or spoken, may not be ideal for a particular occupant. As a result, the occupant may not respond to messages or may ignore messages, thereby resulting in reduced awareness.

SUMMARY

Example systems and methods relate to stylizing messages within a vehicle according to an occupant and a current context. As noted previously, different people perceive messages differently. By way of example, a novice driver may respond better to messages with more detail than an expert driver. Moreover, a driver that is experiencing stress from a complex or dangerous traffic pattern may respond negatively to a stern tone of a message, while a softer tone may induce improved driving. Overall, in various different contexts and according to different current states of the driver, the message, as generated by the vehicle, is of a predefined style. Thus, the message may not be perceived well or at all by the driver or other occupant due to aspects of the current context.

Accordingly, in at least one arrangement, a message system is disclosed that implements a novel approach to determining a style that is specific to the current context and providing messages based on the style. For example, in one arrangement, the system actively acquires sensor data about the occupant(s) (e.g., a driver), the vehicle, and an environment around the vehicle. The sensor data can include a wide variety of information but is generally focused on characterizing a current context. As one example, the system may collect state information about a driver, such as a current mental/emotional state, current operating characteristics of the vehicle, information about the surrounding environment (e.g., traffic, etc.), prior driving behaviors, and so on. In any case, the system processes the sensor data using a style model to determine a style for presenting messages that best conforms with the context as defined according to observations embodied in the sensor data.

As such, the message system can then generate messages according to the style in order to provide the messages in a way that is more likely to induce a desired response from the occupant/driver. It should be noted that the particular way in which the message system generates the message may vary according to the implementation. For example, the message system may implement one or more machine learning algorithms to facilitate generating the message. In one approach, the message system implements a language model (e.g., a large language model (LLM)) that intakes an indicator of the style and the message and outputs the message in the particular style. The system may then present the message either in a spoken form or by displaying text of the particular style. In this way, the system improves the way in which an occupant/driver perceives the message, thereby improving awareness and control of the vehicle.

In one embodiment, a message system is disclosed. The message system includes one or more processors and a memory communicably coupled to the one or more processors. The memory stores instructions that, when executed by the one or more processors, cause the one or more processors to determine a style for presenting messages associated with an occupant of a vehicle according to a context defined in relation to an occupant and an environment of the vehicle. The instructions include instructions to generate a message according to the style for the occupant. The instructions include instructions to provide the message to the occupant.

In one embodiment, a non-transitory computer-readable medium including instructions that, when executed by one or more processors, cause the one or more processors to perform various functions is disclosed. The instructions include instructions to determine a style for presenting messages associated with an occupant of a vehicle according to a context defined in relation to an occupant and an environment of the vehicle. The instructions include instructions to generate a message according to the style for the occupant. The instructions include instructions to provide the message to the occupant.

In one embodiment, a method is disclosed. In one embodiment, the method includes determining a style for presenting messages associated with an occupant of a vehicle according to a context defined in relation to an occupant and an environment of the vehicle. The method includes generating a message according to the style for the occupant. The method includes providing the message to the occupant.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with stylizing messages within a vehicle according to an occupant and a current context are disclosed. As noted previously, different people perceive messages differently. These differences in perception may relate to a current context of the vehicle and/or the passenger, including aspects such as traffic, weather, an emotional state of the driver, and so on. Overall, in various different contexts and according to different current states of the driver, the message, as generated by the vehicle, is of a predefined style. Thus, the message may not be perceived well or at all by the driver or other occupant due to aspects of the current context.

Accordingly, in at least one arrangement, a message system is disclosed that implements a novel approach to adapting messages for a current context by, for example, determining a style that is specific to the current context and providing messages based on the style. In one arrangement, the system actively acquires sensor data about the occupant(s) (e.g., a driver), the vehicle, and an environment around the vehicle. The sensor data can include a wide variety of information but is generally focused on characterizing a current context. As one example, the system may collect state information about a driver such as a current mental/emotional state, current operating characteristics of the vehicle, information about the surrounding environment (e.g., traffic, etc.), prior driving behaviors, and so on. In any case, the system processes the sensor data using a style model to determine a style for presenting messages that best conforms with the context as defined according to observations embodied in the sensor data.

As such, the message system can then generate messages according to the style in order to provide the messages in a way that is more likely to induce a desired response from the occupant/driver (e.g., take a particular action). It should be noted that the particular way in which the message system generates the message may vary according to the implementation. For example, the message system may implement one or more machine learning algorithms to facilitate generating the message. In one approach, the message system implements a language model (e.g., a large language model (LLM)) that intakes an indicator of the style and the message and outputs the message in the particular style. The system may then present the message either in a spoken form or by displaying text of the particular style. Moreover, the message system may undertake different approaches to training the machine learning algorithm, such as reinforcement learning from human feedback, supervised learning, etc. In this way, the system improves the way in which an occupant/driver perceives the message, thereby improving awareness and control of the vehicle.

Figure 1:
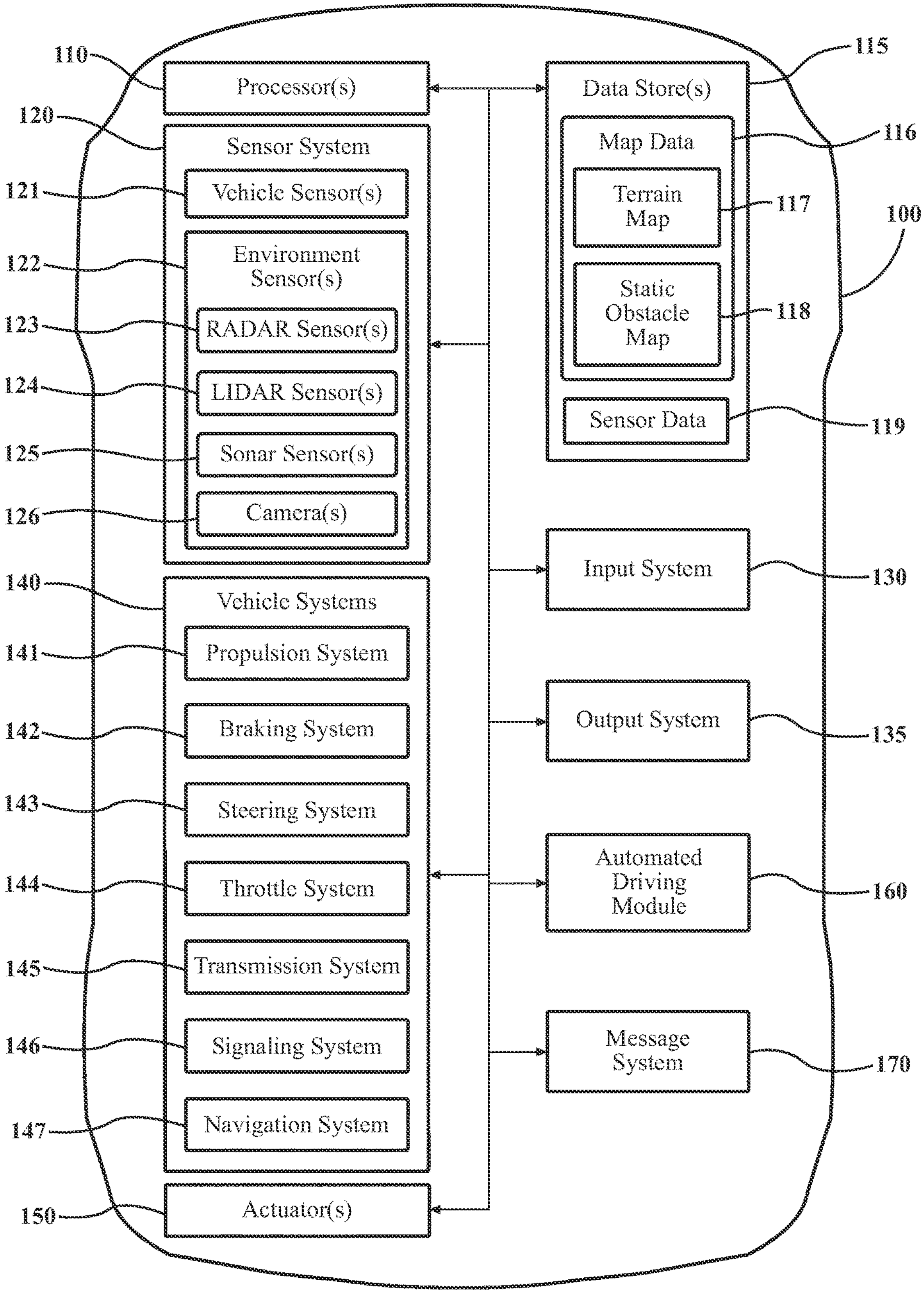
FIG. 1 illustrates one embodiment of a vehicle within which systems and methods disclosed herein may be implemented.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any electronic device (e.g., smartphone, surveillance camera, robot, static roadside unit (RSU), etc.) that, for example, benefits from the functionality discussed herein.

In any case, the vehicle 100 (or another electronic device) also includes various elements. It will be understood that, in various embodiments, it may not be necessary for the vehicle 100 to have all of the elements shown in FIG. 1. The vehicle 100 can have a different combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are illustrated as being located within the vehicle 100, it will be understood that one or more of these elements can be located external to the vehicle 100. Further, the elements shown may be physically separated by large distances and provided as remote services (e.g., cloud-computing services, software-as-a-service (SaaS), distributed computing service, etc.).

Some of the possible elements of the vehicle 100 are shown in FIG. 1 and will be described along with subsequent figures. However, a description of many of the elements in FIG. 1 will be provided after the discussion of FIGS. 2-5 for purposes of the brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In any case, the vehicle 100 includes a message system 170 that functions to train and implement a model to determine a style for presenting messages according to a current context. As an initial note, it should be appreciated that while a single model is generally described, in various arrangements, the model may be comprised of multiple separate models that perform various parts of the overall task. Moreover, while depicted as a standalone component, in one or more embodiments, the message system 170 is integrated with other systems, such as the automated driving module 160, or another component of the vehicle 100. The noted functions and methods will become more apparent with a further discussion of the figures.

Figure 2:
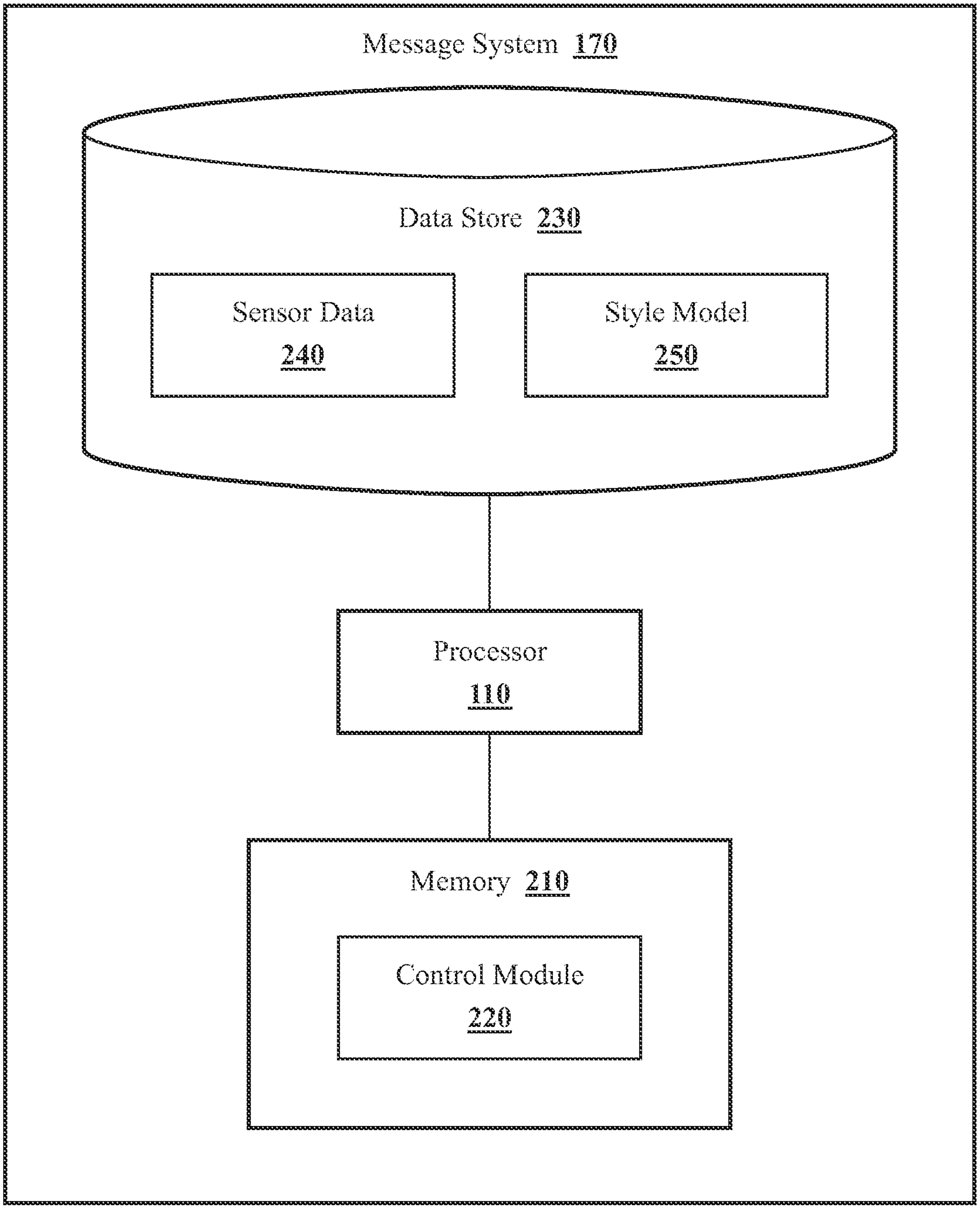
FIG. 2 illustrates one embodiment of a message system that is associated with stylizing messages according to a current context.

With reference to FIG. 2, one embodiment of the message system 170 is further illustrated. The message system 170 is shown as including a processor 110. Accordingly, the processor 110 may be a part of the message system 170 or the message system 170 may access the processor 110 through a data bus or another communication path. In one or more embodiments, the processor 110 is an application-specific integrated circuit (ASIC) that is configured to implement functions associated with a control module 220. In general, the processor 110 is an electronic processor, such as a microprocessor, that is capable of performing various functions, as described herein. In one embodiment, the message system 170 includes a memory 210 that stores the control module 220. The memory 210 is a random-access memory (RAM), read-only memory (ROM), a hard disk drive, a flash memory, or other suitable memory for storing the control module 220. The control module 220 is, for example, computer-readable instructions that, when executed by the processor 110, cause the processor 110 to perform the various functions disclosed herein.

Furthermore, in one embodiment, the message system 170 includes a data store 230. The data store 230 is, in one embodiment, an electronic data structure, such as a database, that is stored in the memory 210 or another memory, and that is configured with routines that can be executed by the processor 110 for analyzing stored data, providing stored data, organizing stored data, and so on. Thus, in one embodiment, the data store 230 stores data used by the control module 220 in executing various functions. In one embodiment, the data store 230 includes sensor data 240, and a style model 250, which may include multiple separate sub-models for performing different tasks, along with, for example, other information that is used by the control module 220.

While not explicitly illustrated, in various arrangements, the data store 230 may also include training data for training the style model 250. The training data can include annotated data for supervised learning, driving snippets and messages for human-in-the-loop reinforcement training, metrics for defining reward functions, and so on. Further details of the training will be described with subsequent figures.

With reference to the sensor data 240, the sensor data 240 can include a wide array of different information depending on the implementation. In various approaches, the sensor data 240 can include internal observations of the vehicle 100, observations of the vehicle 100 itself, and external observations of the vehicle 100. In general, the system 170 acquires the sensor data 240 to derive a current context that may characterize an emotion of the occupant, a physiological response of the occupant, a behavior of the vehicle, characteristics of the surrounding environment of the vehicle 100, and so on.

Accordingly, the control module 220 generally includes instructions that function to control the processor 110 to retrieve data from sensors of a sensor system 120 of the vehicle 100. In other words, the control module 220 includes instructions to acquire occupant state information that characterizes a present mental state of the occupant, including emotions, present actions of the occupant, where a gaze of the occupant may be directed, autonomic responses of the occupant, physiological responses/conditions of the occupant, and so on. It should be appreciated that the present disclosure provides an exemplary listing of aspects associated with the occupant that can be monitored to produce the occupant state information; however, this listing is not to be construed as limiting and is provided as an exemplary list of possibilities for purposes of this discussion.

Accordingly, by way of example, the occupant state information can include information about a direction of a gaze, a path/track of the gaze, heart rate, blood pressure, respiratory function, blood oxygen levels, perspiration levels, pupil dilation/size, brain activity (e.g., EEG data), salivation information, hand/arm positions, foot/leg positions, a general orientation of the occupant in the vehicle 100 (e.g., forward-facing, rear-facing, etc.), seat position, rate of movement, facial feature movements (e.g., mouth, blinking eyes, moving head, expressions, etc.), and so on.

Additionally, the control module 220 can determine the occupant state information in multiple different ways depending on a particular implementation. In one embodiment, the control module 220 communicates with various sensors of the sensor system 120, including one or more of: camera(s) 126 (e.g., for gaze/eye tracking), heart rate monitor sensors, infrared sensors, seat position sensors, and so on. In one embodiment, the sensors are located within a passenger compartment of the vehicle 100 and can be positioned in various locations in order to acquire information about the noted aspects of the occupant and/or aspects related to the occupant. Furthermore, the sensor system 120 can include multiple redundant ones of the sensors in order to, for example, improve the accuracy/precision of collected occupant state information. In this way, the system can determine aspects of the current context relating to occupants of the vehicle 100 when customizing the presentation of messages.

Of course, as previously noted, the message system 170, in different configurations, can also consider other aspects, such as the current and past behaviors of the vehicle, operating characteristics of the vehicle, and characteristics of the external environment. Accordingly, the sensor module 220 generally includes instructions that function to control the processor 110 to receive data inputs from a set of sensors that include information about these separate aspects. In one embodiment, the set of sensors include, for example, sensors of the vehicle 100 (e.g., sensor system 120), sensors in communication with the vehicle 100 over a communication link (e.g., infrastructure-based and/or vehicle-based sensors), and so on.

Accordingly, the control module 220 generally includes instructions that cause the processor 110 to control one or more sensors of the vehicle 100 to generate an observation about the surrounding environment. Broadly, an observation, as acquired by the control module 220, is information about current surroundings, including objects present therein and conditions of the environment overall as perceived by at least one sensor. Thus, the observation is generally a group of one or more data that are processed into a meaningful form.

The control module 220, in one embodiment, controls respective sensors of the vehicle 100 to provide the data inputs in the form of the sensor data 240. The control module 220 may further process the sensor data 240 into separate observations of the surrounding environment. For example, the control module 220, in one approach, fuses data from separate sensors to provide an observation about a particular aspect of the surrounding environment. By way of example, the sensor data 240 itself, in one or more approaches, may take the form of separate images, radar returns, LiDAR returns, and so on. The control module 220 may derive determinations (e.g., location, trajectory, etc.) from the sensor data 240 and fuse the data for separately identified aspects of the surrounding environment, such as surrounding vehicles. The control module 220 may further extrapolate the sensor data 240 into an observation by, for example, correlating the separate instances of sensor data into a meaningful observation about the object beyond an instantaneous data point. For example, the sensor module 220 may track a surrounding vehicle over many data points to provide a trajectory.

Additionally, while the control module 220 is discussed as controlling the various sensors to provide the sensor data 240, in one or more embodiments, the module 220 can employ other techniques that are either active or passive to acquire the sensor data 240. For example, the control module 220 may passively sniff the sensor data 240 from a stream of electronic information provided by the various sensors or other modules/systems in the vehicle 100 to further components within the vehicle 100. Moreover, as noted, the control module 220 can undertake various approaches to fuse data from multiple sensors when providing the sensor data 240. Thus, the sensor data 240, in one embodiment, represents a combination of perceptions acquired from multiple sensors.

Of course, depending on the sensors that the vehicle 100 includes, the available sensor data 240 that the system 170 can harvest may vary. As one example, according to a particular implementation, the vehicle 100 may include different types of cameras or placements of multiple cameras. In an additional aspect, the control module 220 may acquire aspects relating to a state of the vehicle 100 and/or observations from nearby entities that communicate via a cloud environment. For example, the sensor data 240 may further include IMU data from the vehicle 100, a GPS location of the vehicle, a current speed of the vehicle 100, and so on. Moreover, the observations that the control module 220 acquires may include trajectory and position information about nearby dynamic objects.

With continued reference to FIG. 2, the style model 250 is illustrated and described as a discrete model that is, for example, a machine learning algorithm. However, in various approaches, the style model 250 is comprised of multiple separate models that perform different tasks related to styling the messages. As will be described in greater detail subsequently, the style model 250 is generally responsible for determining a style according to the sensor data 240 and generating a message according to the style. Thus, in various arrangements, the style model 250 may perform these tasks in a single shot according to the input of the sensor data 240 and an indicator defining the particular message to be provided. In further approaches, the style model 250 may be comprised of a context model that determines the style from the sensor data 240 and a separate message model that generates the message when provided with the style. In yet further arrangements, the message model may be comprised of multiple models, such as separate models for that generate messages according to different styles and a selection model that ranks the messages and selects a message according to which one most closely conforms to an identified style for providing the message.

Moreover, the form of the style model 250 may also vary according to the implementation. That is, the style model 250 may have different types of architectures depending on the implementation. In one approach, the style model 250 is a language model, which may be a large language model (e.g., generative pre-trained transformer (GPT) network). The style model 250 may be a recurrent neural network (RNN), such as a long short-term memory (LSTM) model. In general, the system 170 trains the style model 250, or the models that comprise the style model 250, to learn a low-dimensional latent space of sentence style preferences that covers the variations in people's preferences for sentences. This low-dimensional space may be conditioned on the various contextual inputs, such as particular driving scenarios and past driver behavior.

Training the style model 250 may also take different forms, such as supervised learning and/or reinforcement learning. In one arrangement, the control module 220 trains the style model 250 according to reinforcement learning where the control module 220 defines a metric that is applied as a reward function. That is, control module 220 may define the metric in relation to behaviors of the driver, such as a lap time around a track. In further examples, the metric may be determined as an offset from an optimal driving/racing line, which may include a speed profile, control input timing (e.g., braking, steering, accelerating, etc.), and a distance from an optimal position. In further examples, the metric includes assessing aspects related to safety, such as distances to vehicles/obstacles, collisions, speeds relative to limits, etc. It should be noted that the training may occur as an online process or an offline process that uses driving data. Thus, the style model 250 itself may be pretrained, partially trained, or untrained.

Of course, while reinforcement learning is described that uses a specific metric, the control module 220 may also implement other forms of training, such as supervised training. In one approach, the control module 220 acquires labels for different messages. In other words, a labeler reviews messages within the context of different driving scenarios and provides an indication of whether the style of the message is appropriate or not. In still further examples, the labeler may comparatively rank messages for a particular context. For example, the labeler may receive multiple messages for a specific context and rank which message best fits the context. In this way, the control module 220 is able to train the style model 250.

Now, turning to the messages, the messages themselves may take many different forms. In various embodiments, the messages may relate to driver training, such as instructions about how to control the vehicle 100. The instructions may relate to a racing context, such as on a racing track, or normal driving on public streets. In further arrangements, the messages are associated with safety alerts, vehicle condition alerts, multimedia messages (e.g., mobile phone calls), and/or other messages that may be generated by the vehicle 100 or presented through systems of the vehicle 100.

With continued reference to FIG. 2 and the control module 220, in one or more configurations, the control module 220 functions to determine a style according to the sensor data 240. The way in which the control module 220 determines the style may vary according to the implementation. For example, in one approach, the control module 220 applies the style model 250 to the sensor data 240 to first determine the style for presenting the message and then applies a separate sub-component of the style model 250 to derive the actual message.

The style itself defines how the message system 170 presents the message. It should be noted that the particular aspects that the system 170 adapts may vary by implementation but can include various combinations of the subsequently listed elements. Moreover, the message may be presented in different forms, including spoken audio that is generated by the system 170 and/or text that may be displayed within the vehicle 100. Accordingly, the control module 220 may adapt aspects of the message for presentation, including dialect, content (e.g., degree of specificity for instructions), an extent to which the language of the message is verbose versus brief, cadence, timing of delivery of the message (e.g., how close to a maneuver or when during a maneuver to provide the message), grammar, word selection, polite vs. stern, playful vs. rude, a type of voice for speaking the message, a volume of the audio, and so on. In relation to generating the message as text, the control module 220 is able to adapt font, color, placement, and other aspects in addition to the general elements (e.g., grammar, content, etc.) listed for a spoken message.

After generating the message, the control module 220 provides the message by presenting the message through a display and/or via spoken language within the vehicle 100 to an intended occupant or occupants. In general, the message system 170 directs the messages to the driver; however, in various contexts, the messages may be directed to all of the occupants or to a specific passenger. For example, when a passenger interferes with a safety device (e.g., a seatbelt, a door latch/lock, etc.) the message may be directed to the passenger. In any case, the message system 170 generates and provides the message in a particular style that is predicted to induce a desired behavior in the occupant.

Figure 3:
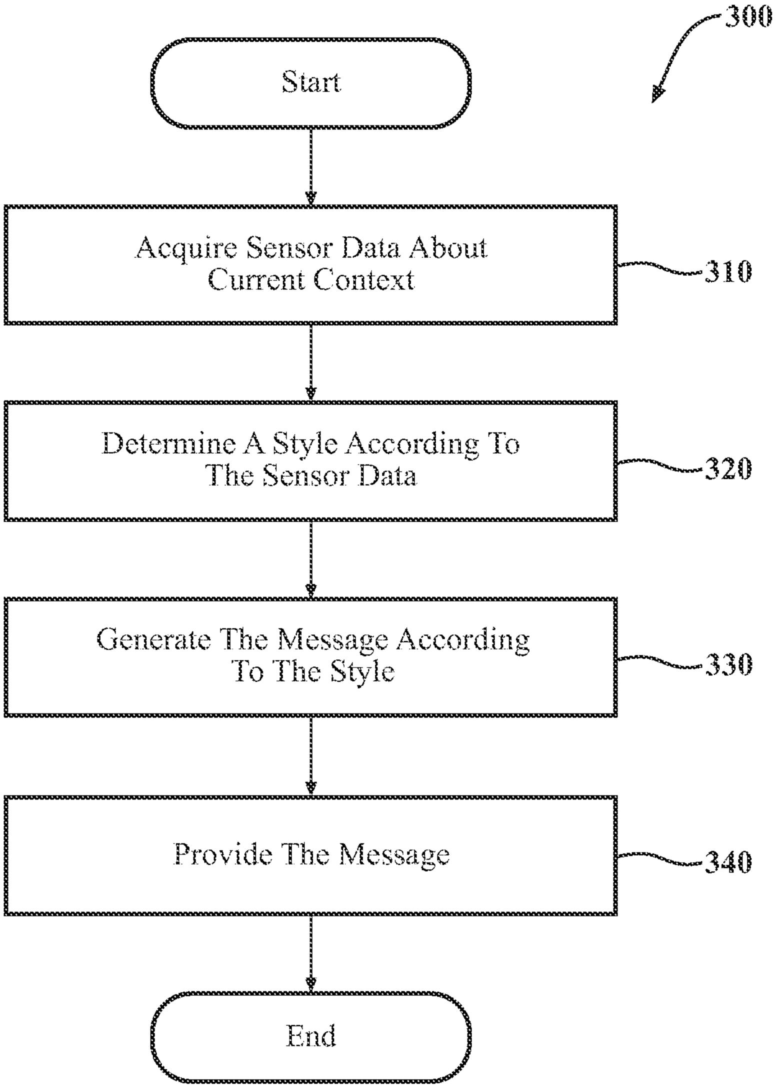
FIG. 3 is a flowchart illustrating one embodiment of a method for stylizing messages within a vehicle.

FIG. 3 illustrates a flowchart of a method 300 that is associated with stylizing messages within a vehicle according to an occupant and a current context. Method 300 will be discussed from the perspective of the message system 170. While method 300 is discussed in combination with the message system 170, it should be appreciated that the method 300 is not limited to being implemented within the message system 170 but is instead one example of a system that may implement the method 300.

At 310, the control module 220 acquires the sensor data 240 defining a current context associated with occupants, the vehicle 100, and the surrounding environment of the vehicle 100. As previously outlined, the control module 220 acquires the sensor data 240 sensors available from the vehicle 100 and/or external sensors from other devices, which may communicate with the message system 170 via vehicle-to-vehicle (V2V), vehicle-to-infrastructure (V2I), or other available communication standards. The content of the sensor data 240 may vary by implementation, but the control module 220 collects the sensor data 240 to characterize the current context. The current context may define aspects relating to a current mental/emotional state of the occupants so that the system 170 can characterize context and determine which style for presenting the message may be best received by the occupant and induce a desired response. Thus, as may be expected, many different data points may directly or indirectly contribute to understanding the current context.

Accordingly, the sensor data 240 may include information about past driving behaviors of the vehicle 100 (e.g., a prior 10 s or more of trajectory data). In further arrangements, the sensor data 240 includes explicit observations of the occupant/driver, such as camera/video images, and other data as outlined previously. The information about the occupant/driver may also include explicit knowledge of how the style influences the driver/occupant, including explicit instructions from the occupant about their feelings of a current style or their emotional/mental state in general, implicit statements from the occupant, such as voice tone, general spoken statements about their perceptions, and so on.

Further information can include information about the vehicle 100 itself, such as vehicle performance (e.g., steering angle, accelerator inputs, etc.), trajectory information, dynamics data, telematics data, and so on. Moreover, the sensor data 240 may also include external observations about nearby objects, weather, vehicle location (e.g., highway, rural, urban, etc.). In any case, the sensor data 240 may vary but can include external observations of the vehicle 100 (e.g., the surrounding environment), internal observations, and information about the vehicle 100 itself.

At 320, the control module 220 determines a style for presenting messages. As previously described, the messages can take various forms but are generally alerts or other informational indicators provided to the occupant that seek to induce awareness in the occupant or a behavior, such as a change in control of the vehicle 100. As a preliminary note, it should be understood that depending on the particular implementation, the determination of the style may occur in an explicit form, such as by the style model generating an explicit output defining the style, as a ranking where the style model ranks messages according to conformance with a desired style, as an internal correlation of the style model 250, or a sub-model thereof), etc. Each of the separate approaches will be described in detail subsequently.

Whichever approach is undertaken, the sensor data 240 functions as the input for determining the style. Thus, in the case of using the style model 250 to generate an explicit output specifying the style, the style model 250 accepts the sensor data 240 as an input and outputs and indicator of the style. As previously highlighted, the style defines how the message is presented to the occupant, including defining grammar, content, timing, and cadence of a presentation of the message. Thus, the style may involve determining spoken language for presenting the message and attributes of how the message is spoken, including dialect, tone, etc. The content may be defined by the style in relation to verboseness, word selection, and so on. Similarly, the message system 170 may also adapt the message when presented in a textual form with the addition of also adapting a form of the text itself and how the text is presented (e.g., location, duration, etc.).

In relation to the other approaches to determining the style, the style model 250 may not provide an explicit output. Instead, the style model 250 still accepts the sensor data 240 as the input, but internally processes the sensor data 240 into feature representations within a low-dimensional latent space that correlates the sensor data 240 with the style. Thereafter, the style model 250 uses the correlation of the features as a determination of the style and produces the message via ranking or explicit generation according thereto.

At 330, the control module generates a message according to the style for the occupant. As an initial aspect of generating a message, a single occupant is described as the target of the message and as an aspect about which contextual information is collected and analyzed; however, in one or more arrangements, the target of the message may include multiple occupants of a vehicle, including a driver and passengers. Thus, the style and the message may be in relation to more than one occupant.

To generate the message itself, in the case of using a distinct sub-model of the style model 250. The sub-model accepts the style as an input along with an indicator specifying content of the message and outputs the message in the particular style. The message system 170, in one configuration, acquires the indicator from a sub-system of the vehicle 100, such as the automated driving module 160, one of the vehicle systems 140, or another system of the vehicle 100. The message may be in regards to safety, conditions of the vehicle 100, and/or ancillary activity, such as driver training. In any case, the indicator specifies a general content of the message, such as a condition or other information that is to be presented to the occupant. In further arrangements, the indicator may include additional information, including an urgency/timing of the message or other indicators specifying aspects about how the message should be presented.

Turning to the other options for generating the message, in the case of the end-to-end use of the style model 250, the style model 250 accepts the indicator and the sensor data 240 and outputs the message in a style that corresponds to the context defined by the sensor data 240. In the case of a ranked approach, the control module 220 can leverage multiple separate sub-models of the style model 250. That is, the style model 250 may be formed from a plurality of message models where each of the message models generates a message in a different style according to how the respective model is trained.

By way of example in relation to training a driver about racing a vehicle on a track, the separate sub-models may be specific to different skill levels. One model may generate messages for expert-level drivers, one model may generate messages for intermediate-level drivers, one model may generate messages for novice-level drivers, one model may generate messages for timid drivers, and so on. The number of models can vary depending on the implementation but function to generate variations of the message according to different styles. In any case, the control module 220 may provide the indicator about the message to the separate sub-models, which then generate style-specific messages. The control module 220 then applies another sub-model of the style model 250, a selection model. The selection model, in one approach, accepts the sensor data 240, or the style, as an input along with the messages generated by the message models. The selection model then ranks the messages according to the style defined by the context. The selection model ranks the messages according to how closely the messages conform to the style. As a result, the control module 220 can select one of the variations of the message from the group that most closely conforms with the style per the ranking.

At 340, the control module 220 provides the message to the occupant. As noted previously, the message system 170 may provide the message in an audible form as spoken language or as text displayed on one or more displays within the vehicle. The displays may include a heads-up display (HUD), an instrument cluster display, an infotainment display, or other displays within the vehicle 100. In relation to the message as spoken audio, the control module 220 controls one or more speakers within the vehicle 100 to provide audio from a voice-synthesized form of the message. In this way, the message system 170 is able to improve a form of the message and better induce a desired response from the occupant.

Figure 4:
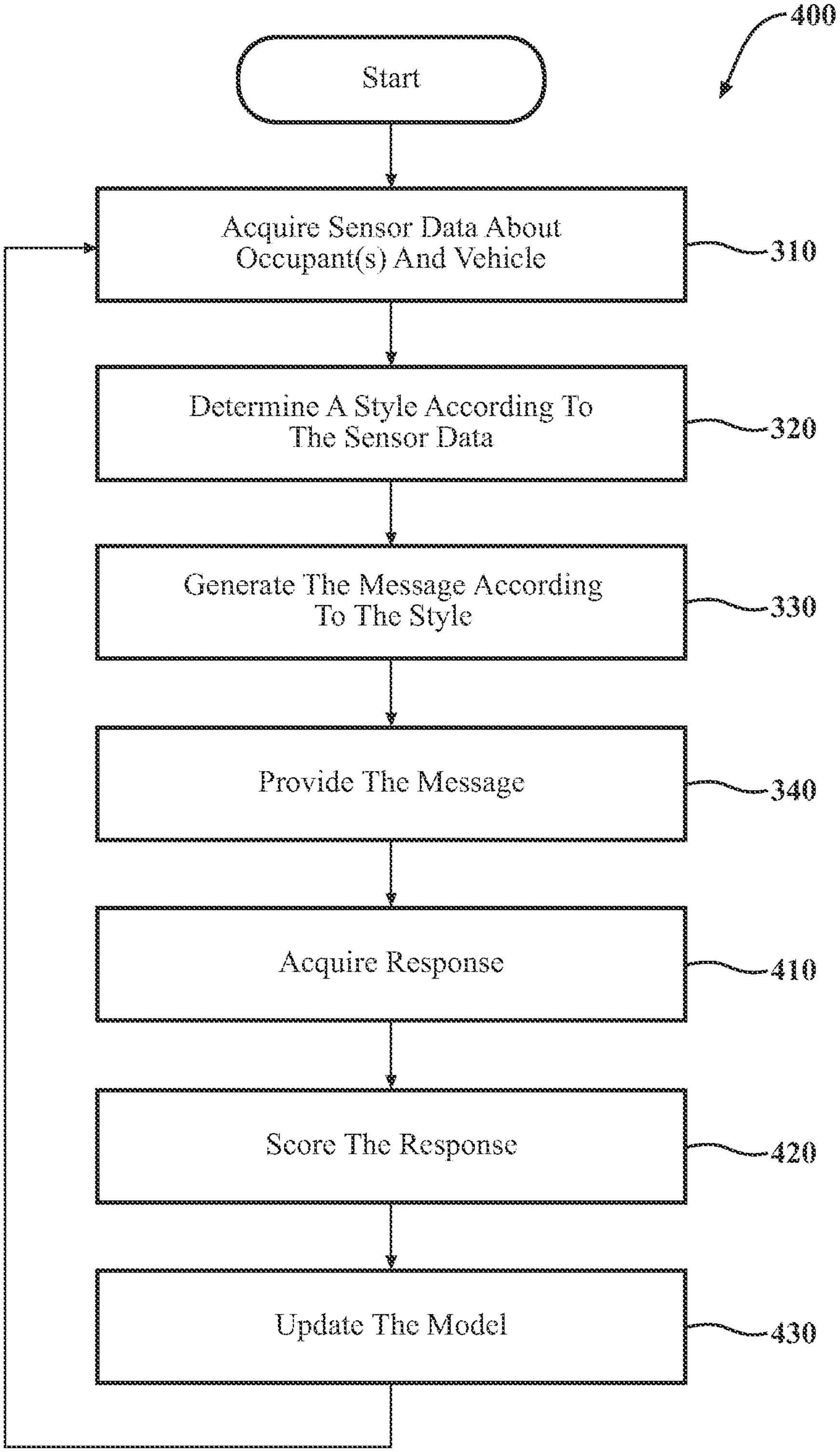
FIG. 4 is a flowchart illustrating one embodiment of a method for training a style model.

FIG. 4 illustrates a flowchart of a method 400 that is associated with training a style model to generate stylized messages. Method 400 will be discussed from the perspective of the message system 170. While method 400 is discussed in combination with the message system 170, it should be appreciated that the method 400 is not limited to being implemented within the message system 170 but is instead one example of a system that may implement the method 400. Moreover, method 400 is directed to one approach to training the style model 250. Additional implementations will be discussed following the description of FIG. 4.

As an initial point about method 400, FIG. 4 illustrates the method 400 as including blocks 310-340 of the method 300. It should be appreciated that the various approaches described along with the method 300 that employ the style model 250 may be trained according to the method 400 or further approaches outlined subsequently. In any case, the functions associated with blocks 310-340 will not be described again for purposes of brevity.

At 410, the control module 220 acquires a response from the occupant based on the providing the message at 340. In at least one approach, the control module 220 uses sensors of the vehicle 100 to acquire the response. Similar to acquiring the sensor data 240 at 310, the control module 220 may monitor for the response by acquiring additional sensor data about the occupant(s), the vehicle 100, and/or the surroundings of the vehicle 100. In general, the information that the control module 220 acquires as the response relates to the metric implemented to score the style model 250. Of course, in further approaches, the occupant may provide explicit feedback about the message. For example, the occupant may explicitly indicate whether message evoked a response, whether they preferred the style of the message or not, and so on.

At 420, the control module 220 assesses the response according to the collected sensor data. For example, in one approach, the control module 220 assesses the response using a metric. The metric defines how to assess the response and reward the style model 250 for training. Defining the metric in this way may include a binary determination or a more complex assessment of the information about the response. By way of example, the metric may define an explicit action of the occupant, such as using a turn single. In another embodiment, the metric may define an optimal racing line and how to assess whether the vehicle 100 satisfies the optimal racing line (e.g., lap time, braking timing and degree, speed profiles, etc.). In further examples, the metric may define the safety of a drivers control by determining distances to obstacles (e.g., other vehicles, pedestrians, etc.), speeds relative to limits, and so on. In yet further arrangements, the metric may relate to changes in emotional states of the occupants (e.g., whether the occupant becomes calmer as indicated by a heart rate), improvements in fuel efficiency, and so on. In general, this approach to reinforcement learning with human feedback operates to directly assess how the adapted message influences actions of the occupant.

At 430, the control module 220 updates the style model 250. In at least one approach, updating the style model 250 using the values determined from the metric involves rewarding the style model 250 for a positive determination of the metric or punishing the style model 250 according to a negative assessment with the metric. In both cases, values of the style model 250 are adjusted to adapt how the style model determines the style and generates the message. In this way, the message system 170 can train the style model 250 to adapt the messages. It should be appreciated that while training is discussed broadly, this approach to training may be used in different ways. For example, the message system 170 may refine the style model 250 using the above-described approach, in which case the style model 250 is already trained. In further examples, the message system 170 performs all of the training according to method 400.

Moreover, while approaches using one form of reinforcement learning are outlined, the message system may also apply supervised learning to train the style model 250. In this approach, the message system 170 trains the style model 250 according to annotations of inputs. That is, the message system 170 may acquire the annotations from a labeler that generates the annotations for different driving scenarios. For example, the labeler may define the annotation as either appropriate or not appropriate according to the driving scenario. In further examples, the labeler may rank multiple messages for a given driving scenario according to a desired style. In yet further examples, the labeler may specify how well a message correlates to different driving scenarios. Accordingly, the particular form of the training may vary according to a desired implementation. As a final point, while the training discussed in relation to method 400 is described as being online training, in further aspects, the training may occur offline using captured information from the vehicle 100.

Figure 5:
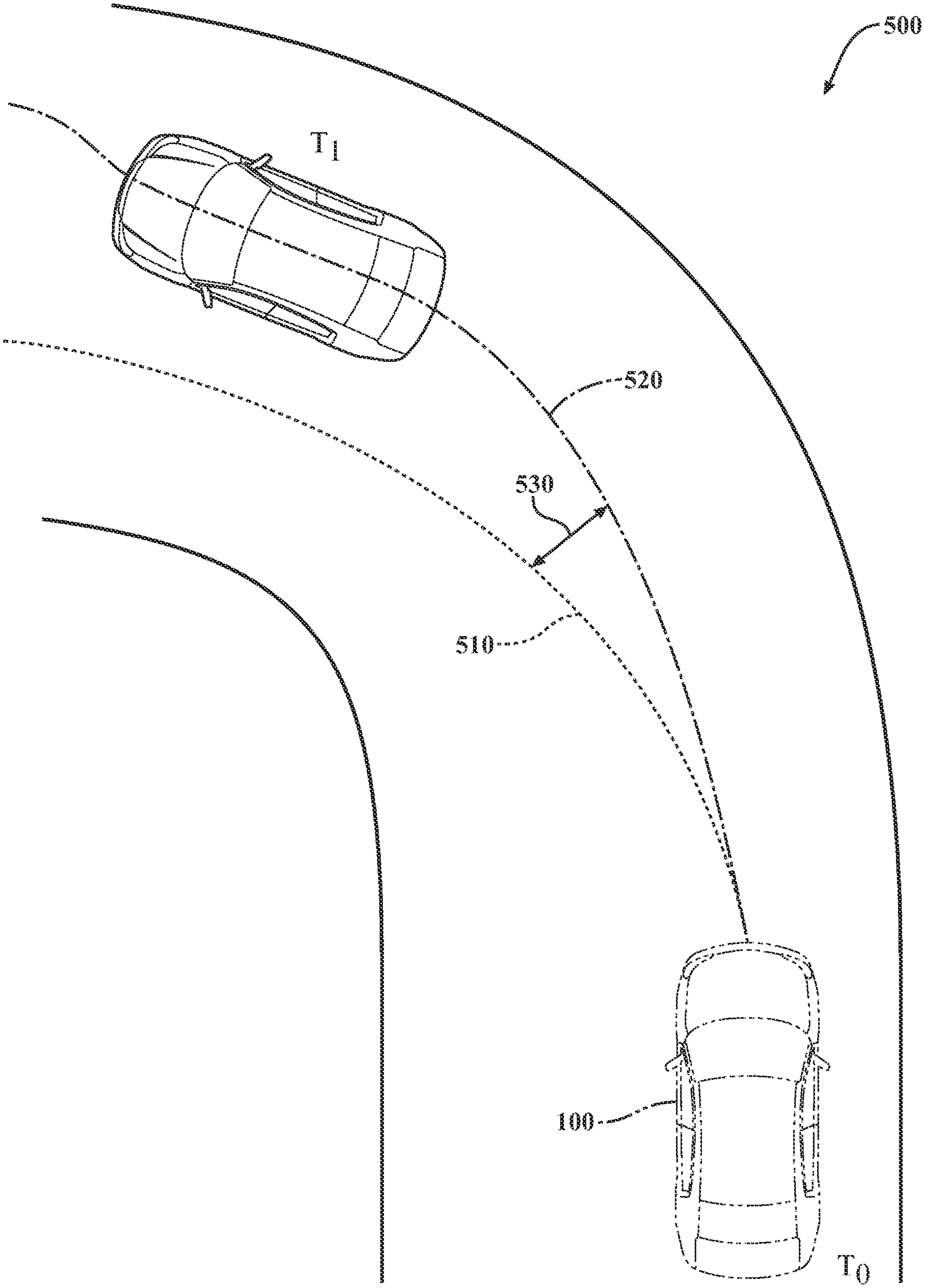
FIG. 5 illustrates an example scenario in which the message system may be employed to adapt messages.

FIG. 5 illustrates one example scenario in which the message system 170 adapts messages for presentation to a driver. As illustrated, the vehicle 100 is approaching a curve 500 within a roadway. Accordingly, the message system 170 may generate a message instructing the driver to apply breaks at a specific point before the curve 500 so that the vehicle 100 can move through the curve 500 with an optimal speed. The optimal path 510 is illustrated by the dashed line, whereas the actual path 520 is shown by the solid line. Accordingly, the control module 220 may assess the message provided by the system 170 according to a metric that compares the offset of the optimal path 510 and the actual path 520. In this case, the offset 530 is determined according to the metric and used to update the style model 250. As a result, a subsequent lap by the driver of this section of the roadway may result in the style model 250 generating a message that is, for example, more emphatic or otherwise adapts the style of the message to improve control by the driver through the curve 500.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. “Driving environment data” includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124 (e.g., 4 beam LiDAR), one or more sonar sensors 125, and/or one or more cameras 126. In one or more arrangements, the one or more cameras 126 can be high dynamic range (HDR) cameras or infrared (IR) cameras.

The vehicle 100 can include an input system 130. An “input system” includes any device, component, system, element or arrangement or groups thereof that enable information/data to be entered into a machine. The input system 130 can receive an input from a vehicle passenger (e.g., a driver or a passenger). The vehicle 100 can include an output system 135. An “output system” includes a device, or component, that enables information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the message system 170, and/or the automated driving module 160 can be operatively connected to communicate with the various vehicle systems 140 and/or individual components thereof. For example, returning to FIG. 1, the processor(s) 110 and/or the automated driving module 160 can be in communication to send and/or receive information from the various vehicle systems 140 to control the movement, speed, maneuvering, heading, direction, etc. of the vehicle 100. The processor(s) 110, the message system 170, and/or the automated driving module 160 may control some or all of these vehicle systems 140 and, thus, may be partially or fully autonomous.

The processor(s) 110, the message system 170, and/or the automated driving module 160 can be operatively connected to communicate with the various vehicle systems 140 and/or individual components thereof. For example, returning to FIG. 1, the processor(s) 110, the message system 170, and/or the automated driving module 160 can be in communication to send and/or receive information from the various vehicle systems 140 to control the movement, speed, maneuvering, heading, direction, etc. of the vehicle 100. The processor(s) 110, the message system 170, and/or the automated driving module 160 may control some or all of these vehicle systems 140.

The processor(s) 110, the message system 170, and/or the automated driving module 160 may be operable to control the navigation and/or maneuvering of the vehicle 100 by controlling one or more of the vehicle systems 140 and/or components thereof. For instance, when operating in an autonomous mode, the processor(s) 110, the message system 170, and/or the automated driving module 160 can control the direction and/or speed of the vehicle 100. The processor(s) 110, the message system 170, and/or the automated driving module 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, “cause” or “causing” means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof responsive to receiving signals or other inputs from the processor(s) 110 and/or the automated driving module 160. Any suitable actuator can be used. For instance, the one or more actuators

150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module 160 can be configured to receive data from the sensor system 120 and/or any other type of system capable of capturing information relating to the vehicle 100 and/or the external environment of the vehicle 100. In one or more arrangements, the automated driving module 160 can use such data to generate one or more driving scene models. The automated driving module 160 can determine a position and velocity of the vehicle 100. The automated driving module 160 can determine the location of obstacles, obstacles, or other environmental features including traffic signs, trees, shrubs, neighboring vehicles, pedestrians, etc.

The automated driving module 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module 160 either independently or in combination with the message system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module 160 can be configured to implement determined driving maneuvers. The automated driving module 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the Figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A message system, comprising:

one or more processors;

a memory communicably coupled to the one or more processors and storing instructions that, when executed by the one or more processors, cause the one or more processors to:

determine a style for presenting messages associated with an occupant of a vehicle according to a context defined in relation to the occupant and an environment of the vehicle, the message indicating training instructions for instructing the occupant about controlling the vehicle to perform a maneuver;

generate a message according to the style for the occupant, including generating the training instructions of the message as stylistically conditioned according to a current emotional state of the occupant and prior responses of the occupant to previous messages; and provide the message to the occupant to induce the occupant to perform the maneuver, including controlling a speaker to adapt at least a volume according to the style.

2. The message system of claim 1, wherein the instructions to determine the style include instructions to analyze sensor data about the occupant, the vehicle, and the environment using a style model, wherein the instructions to provide the message include instructions to play the message as spoken audio; and wherein the style defines how the message is presented to the occupant, including defining grammar, content, timing, and cadence of a presentation of the message.

3. The message system of claim 1, wherein the instructions to generate the message according to the style include instructions to use a style model to generate the message upon receiving an indicator specifying content of the message.

4. The message system of claim 1, wherein the instructions to generate the message according to the style include instructions to use separate message models to generate variations of the message according to an indicator specifying content of the message, and wherein the separate message models have separate styles that define a form of the message.

5. The message system of claim 4, wherein the instructions to generate the message include instructions to use a style model to rank the variations and select one of the variations according to the rank of the variations in relation to the style.

6. The message system of claim 1, further comprising instructions to:

train a style model to at least determine the style according to a metric that assesses a response of the occupant to the message, wherein the metric defines how to assess the response and reward the style model, and wherein training the style model occurs according to reinforcement learning and the style model is a machine learning algorithm.

7. The message system of claim 1, further comprising instructions to:

train a style model to at least determine the style according to annotations of inputs, wherein the inputs include one or more of an emotion of the occupant, a physiological response of the occupant, and a behavior of the vehicle.

8. The message system of claim 1, wherein the message system is embedded within a vehicle that operates at least semi-autonomously.

9. A non-transitory computer-readable medium including instructions that, when executed by one or more processors, cause the one or more processors to:

determine a style for presenting messages associated with an occupant of a vehicle according to a context defined in relation to the occupant and an environment of the vehicle, the message indicating training instructions for instructing the occupant about controlling the vehicle to perform a maneuver;

generate a message according to the style for the occupant, including generating the training instructions of the message as stylistically conditioned according to a current emotional state of the occupant and prior responses of the occupant to previous messages; and provide the message to the occupant to induce the occupant to perform the maneuver, including controlling a speaker to adapt at least a volume according to the style.

10. The non-transitory computer-readable medium of claim 9, wherein the instructions to determine the style include instructions to analyze sensor data about the occupant, the vehicle, and the environment using a style model, and wherein the style defines how the message is presented to the occupant, including defining grammar, content, timing, and cadence of a presentation of the message.

11. The non-transitory computer-readable medium of claim 9, wherein the instructions to generate the message according to the style include instructions to use a style model to generate the message upon receiving an indicator specifying content of the message.

12. The non-transitory computer-readable medium of claim 9, wherein the instructions to generate the message according to the style include instructions to use separate message models to generate variations of the message according to an indicator specifying content of the message, and wherein the separate message models have separate styles that define a form of the message.

13. The non-transitory computer-readable medium of claim 12, wherein the instructions to generate the message include instructions to use a style model to rank the variations and select one of the variations according to the rank of the variations in relation to the style.

14. A method, comprising:

determining a style for presenting messages associated with an occupant of a vehicle according to a context defined in relation to the occupant and an environment of the vehicle, the message indicating training instructions for instructing the occupant about controlling the vehicle to perform a maneuver;

generating a message according to the style for the occupant, including generating the training instructions of the message as stylistically conditioned according to a current emotional state of the occupant and prior responses of the occupant to previous messages; and providing the message to the occupant to induce the occupant to perform the maneuver, including controlling a speaker to adapt at least a volume according to the style.

15. The method of claim 14, wherein determining the style includes analyzing sensor data about the occupant, the vehicle, and the environment using a style model, wherein providing the message includes playing the message as spoken audio, and wherein the style defines how the message is presented to the occupant, including defining grammar, content, timing, and cadence of a presentation of the message.

16. The method of claim 14, wherein generating the message according to the style includes using a style model to generate the message upon receiving an indicator specifying content of the message, including adapting at least the volume and a tone of how the message is provided as defined by the style, and wherein determining the style includes analyzing the context, including an emotional state of the occupant and current operating characteristics of the vehicle.

17. The method of claim 14, wherein generating the message according to the style includes using separate message models to generate variations of the message according to an indicator specifying content of the message, and wherein the separate message models have separate styles that define a form of the message.

18. The method of claim 17, wherein generating the message includes using a style model to rank the variations and select one of the variations according to the rank of the variations in relation to the style.

19. The method of claim 14, further comprising:

training a style model to at least determine the style according to a metric that assesses a response of the occupant to the message, wherein the metric defines how to assess the response and reward the style model, and wherein training the style model occurs according to reinforcement learning and the style model is a machine learning algorithm.

20. The method of claim 14, further comprising:

training a style model to at least determine the style according to annotations of inputs, wherein the inputs include one or more of an emotion of the occupant, a physiological response of the occupant, and a behavior of the vehicle.

* * * * *